United States Patent [19]

Küpper et al.

[11] 4,274,375
[45] Jun. 23, 1981

[54] PISTON, ESPECIALLY FOR INTERNAL COMBUSTION ENGINES

[75] Inventors: Heinz Küpper, Troisdorf-Sieglar; Helmut Busch, Lohmar, both of Fed. Rep. of Germany

[73] Assignee: Klöckner-Humboldt-Deutz Aktiengesellschaft, Cologne, Fed. Rep. of Germany

[21] Appl. No.: 70,798

[22] Filed: Aug. 29, 1979

[30] Foreign Application Priority Data

Sep. 1, 1978 [DE] Fed. Rep. of Germany ....... 2838130

[51] Int. Cl.³ ............................................. F02B 19/08
[52] U.S. Cl. ..................................... 123/263; 123/276
[58] Field of Search ............... 123/260, 261, 263, 276, 123/305, 294, 295, 193 P

[56] References Cited

U.S. PATENT DOCUMENTS

| 3,107,658 | 10/1963 | Meurer | 123/276 X |
| 3,244,159 | 4/1966 | Meurer | 123/263 X |
| 3,420,216 | 1/1969 | Meurer et al. | 123/276 X |
| 4,009,702 | 3/1977 | Mayer | 123/276 X |

Primary Examiner—Tony M. Argenbright
Attorney, Agent, or Firm—Becker & Becker, Inc.

[57] ABSTRACT

A piston, especially for internal combustion engines, which piston has a cup-shaped combustion chamber depression in the upper face wall, with recesses in the upper edge of the depression for a fuel injection nozzle and an ignition device, respectively. The fuel is injected into the cavity with a short unrestrained length of spray onto the depression wall, and during fuel injection combustion air is moved about an axis extending in the longitudinal direction of the piston. The combustion chamber depression has an at least nearly cylindrical wall in the region of the recesses, the first recess is formed by a trough which has sharp edges, terminates flat, and is inclined to a surface line of the depression. The other recess with which is associated the ignition device extends closely adjacent to the first recess, at an angle in the direction opposite to movement of air, with a ridge being provided between the two recesses. The fuel that is injected onto the wall of the trough has a direction component in the direction of movement of the combustion air.

10 Claims, 3 Drawing Figures

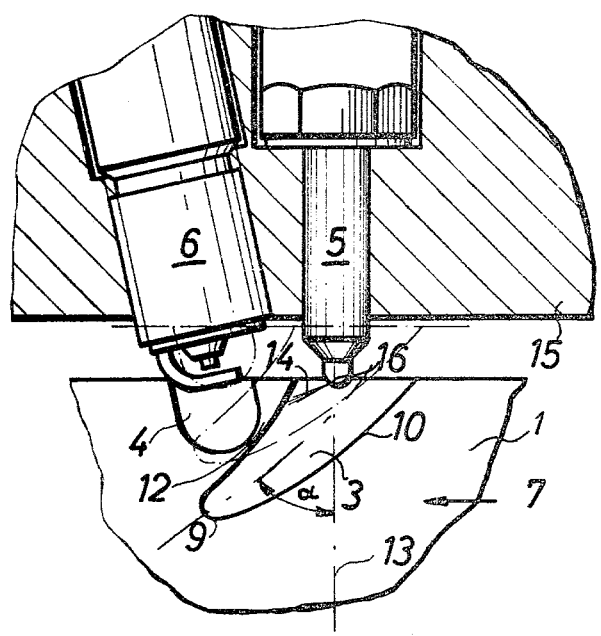

PISTON, ESPECIALLY FOR INTERNAL COMBUSTION ENGINES

The present invention relates to a piston, especially for internal combustion engines, which piston has a cup-like combustion chamber depression or cavity in the upper face wall, with recesses in the upper edge of the depression or cavity for a fuel injection nozzle and an ignition device, respectively. The fuel is injected into the cavity or depression with a short unrestrained or free length of spray, or jet, onto the cavity wall, and during fuel injection combustion air is moved about an axis extending in the longitudinal direction of the piston.

In a known combustion engine the fuel is injected tangentially in the direction of the rotating air movement onto the wall of a spherical combustion chamber cavity or depression. An ignition device is arranged so as to be arranged in diametrically opposed relation to the fuel injection device. This ignition device serves to ignite the gasoline, methanol, and other similar fuels. During injection fuel is deposited on the wall of the cavity, is evaporated or combusted off the wall due to rotating movement of air (combustion air), and is passed to the ignition device.

Since the distance between the fuel injection device and the ignition device is considerable and since the formation of the fuel deposits and the separation by means of the combustion air is dependent, to a large extent, on the number of revolutions and on the pertaining load, an accurate ignition at the predetermined ignition point of time is not always assured. To avoid this disadvantage there are required, despite this limiting the range of revolutions or speed range, extensive spray adjustment devices for shifting the injection point of time in conformity with the number of revolutions and the load. Furthermore, the fuel is ignited at the extreme end of its spread or expansion, viewed in the direction of rotation of the combustion air, so that combustion proceeds in the direction opposite to the movement of air, which means that ignition of the remainder of the fuel will be more difficult. Thus, the combustion is carried out with considerable fluctuations in pressure.

It is an object of the present invention to improve the ignition accuracy or effectiveness of an internal combustion engine over the full speed range, or number of revolutions, and load, and to avoid pressure fluctuations during combustion.

This object and other objects and advantages of the present invention will appear more clearly from the following specification in connection with the accompanying drawings, in which:

FIG. 3 is an enlarged detail, partly in cross section, near a fuel injection nozzle and an ignition device.

Figure 1:
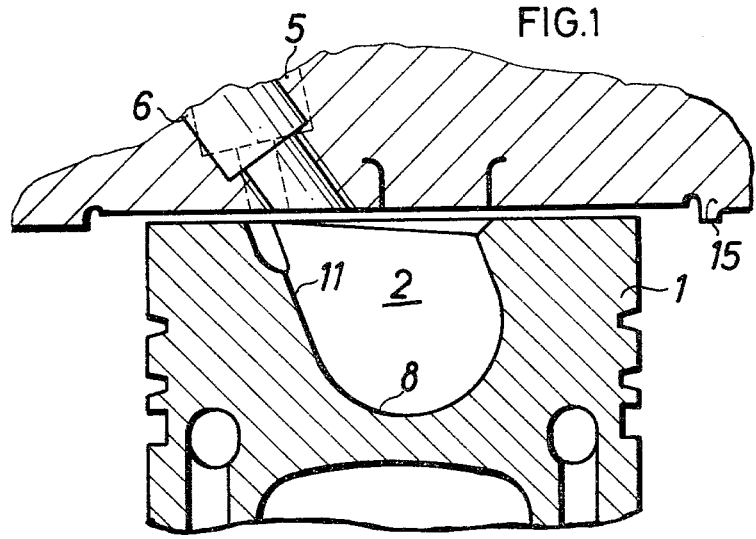
FIG. 1 is a side elevational view in cross section of part of an internal combustion engine near its combustion chamber depression of a pertaining piston.

The piston according to the present invention is characterized primarily therein that the combustion chamber depression or cavity has an at least nearly cylindrical wall in the region of the pertaining recesses, that the first recess, with which is associated a fuel nozzle, is formed by a trough having sharp edges and terminating flat at the end farthest from the fuel nozzle. The trough is inclined to a surface line of the depression or cavity and points in the direction of rotating movement of air towards the bottom of the cavity or depression. The second recess, with which the ignition device is associated, extends closely adjacent to the first recess, at a angle in the direction opposite to movement of air, with a cross-piece or ridge, or edge, being provided between the two recesses. The invention is further characterized in that the fuel is injected onto the wall of the trough which fuel has a direction component in the direction of movement of the combustion air.

By means of the first recess, onto the walls of which fuel is injected with a short free or unrestrained length of spray or jet, a predominant portion of the fuel is passed, initially in a protected manner with respect to the rotating combustion air, into the depression or cavity and is there deposited in an advantageous manner on the combustion chamber depression wall to cover a substantial surface area. A lesser quantity of the fuel is reflected by the trough wall and/or removed on the sharp-cornered ridge in the direction of the second recess, with which the ignition device is associated, and is passed to the ignition device by being captured by the combustion air. Due to the short free or unrestrained length of spray or jet of the fuel, and due to the close proximity of the fuel nozzle and the ignition device, the speed-dependent influence factors of fuel injection and mixture-formation have only little effect on the ignition conditions. This means that over the full range of speeds and loads an accurate and effective ignition is assured. Since the trough edge always attains the same favorable attitude or position with respect to the ignition device at the required time, a constant ignition and injection point of time for the full range of load and number of rotation point can be maintained. Furthermore, utilization of customary spark plugs as ignition device, at low insertion depth by means of threading, is feasible, since the recess for the ignition device prevents that the spark plug is directly subjected to partially combusted fuel. Furthermore, the combustion occurs in the direction of flow of combustion air upon ignition, which means that the combustion process is accelerated and fluctuations in pressure are substantially eliminated.

It has been found advantageous that the trough embraces an angle of about 45° with the surface line. It is then advantageous that the trough extends approximately to half the height of the combustion chamber depression or cavity. Contrary to known internal combustion engines, in which the fuel jet or spray is passed tangentially onto the combustion chamber depression wall, in accordance with the present invention, favorable operating characteristic values can be attained when the fuel jet is directed at an angle of from between 45° and 90° onto the trough wall.

An arrangement of the ignition device and the fuel injection nozzle which is particularly space-saving with respect to the valves which are responsible for the breathing characteristics of the engine is attained when the axis of the fuel injection nozzle and the axis of the ignition device respectively converge towards the bottom of the combustion chamber depression, and when each of them comprises a direction component directed outwardly in the cylinder head. Particularly favorable operating characteristics are obtained when the ignition device and the fuel injection nozzle, the latter with an injection bore or aperture, are penetrating already at the commencement of fuel injection a short distance into the combustion chamber cavity or depression.

Figure 2:
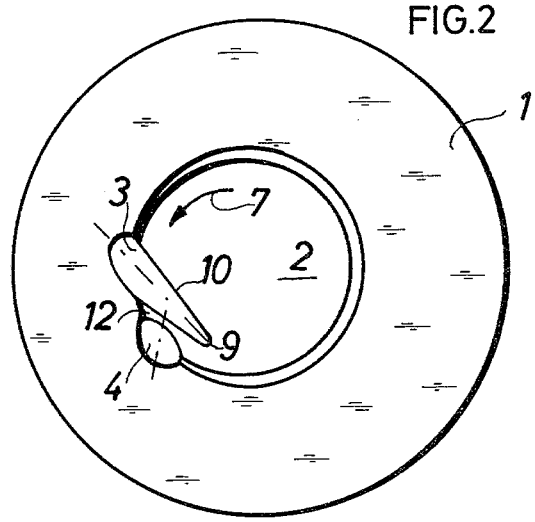
FIG. 2 is a top plan view of a combustion chamber depression.

Referring now particularly to the drawings, FIG. 1 indicates diagrammatically part of a piston 1 with the position indicated representing the upper compression point. In the upper face wall of piston 1 there is provided a combustion chamber depression or cavity 2 which is inclined to the longitudinal central axis of piston 1. The depression 2 is somewhat cup-shaped, with the upper edge thereof including a first recess 3 and a second recess 4. Recess 3 is associated with a fuel injection nozzle 5, while recess 4 is associated with an ignition device 6 which can be a spark plug. The depression 2 is generally cylindrical in the upper part thereof and the first recess 3, which is associated with the fuel nozzle 5, is provided by a trough. The trough is inclined to the surface line, mantle line, or fall line 13 (FIG. 3) of depression 2 in the direction indicated by arrow 7 (FIGS. 2 and 3) which indicates the direction of movement of the combustion air. The trough is directed toward the bottom 8 of the depression 2 and terminates flat or substantially flat at its end furthest away from the fuel nozzle 5. The transitional edges 10 of the trough or recess 3 with the combustion chamber depression 2 are sharp-edged.

The second recess 4, which is associated with the ignition device 6, is arranged closely adjacent to the first recess 3, and extends at an angle to the first recess 3, but in the direction opposite to the direction of movement of the combustion air. A cross-piece, ridge or edge 12, which could be reduced to a sharp cutting edge-like formation, is provided between the first recess 3 and the second recess 4. As indicated in FIG. 3, the piston 1 is in a position corresponding to the commencement of fuel injection. Thus, a jet comprised of fuel, indicated by the numeral 14, is directed at an angle of from between 45° to 90° onto the wall of trough 3. The upper compression point of the system is indicated in dot-dash outline of piston 1 in FIG. 3.

A predominant portion of the injection fuel is passed, in the direction of movement of the combustion air, into the depression 2 and is wall-deposited over a large surface area thereon. A lesser portion is entrained in the combustion air at the ridge, cross-piece, or edge 12 and passed as an ignitable mixture to the ignition device 6. A customary spark plug can be used as the ignition device 6, which is arranged in a protected manner in the recess 4, whereby the ignition device 6 extends only a short distance from the cylinder head 15. Already at the commencement of the fuel injection, the ignition device 6 reaches into the cavity or depression 2. Similarly, the fuel injection nozzle 5, with its nozzle extension having an injection bore 16, extends from commencement of fuel injection to upper compression point of piston 1 increasingly into the cavity or depression 2.

The present invention is, of course, in no way restricted to the specific disclosure of the specification and drawing, but also encompasses any modifications within the scope of the appended claims.

What we claim is:

1. A piston, especially for internal combustion engines, having means for introducing and producing a rotating movement of combustion air, a fuel injection nozzle, and an ignition device, said piston comprising:

a combustion chamber depression in said piston, said depression having a bottom, and an at least nearly cylindrical wall for accommodating combustion air rotation about an axis extending in the longitudinal direction of said piston;

a first recess adapted to communicate with said fuel injection nozzle, said first recess being provided in said at least nearly cylindrical wall and being formed by a sharp-edged trough, said trough being inclined to a pertaining surface line of said combustion chamber depression and pointing in the direction of said rotating movement of air in said depression, said trough presenting a flattened terminating portion at that end furthest from said fuel injection nozzle, whereby fuel having a direction-component in the direction of said rotating movement of air is adapted to be injected onto a pertaining wall of said trough;

a second recess adapted to communicate with said ignition device, said second recess also being provided in said at least nearly cylindrical wall closely adjacent to said first recess, said second recess pointing in the direction opposite to the direction of said rotating movement of air and being positioned at an angle to said first recess; and a separating formation arranged between said first recess and said second recess.

2. A piston according to claim 1, wherein said combustion chamber depression is at least nearly cup-shaped.

3. A piston according to claim 1, wherein said separating formation is a ridge.

4. A piston according to claim 1, wherein said separating formation is a cross-piece.

5. A piston according to claim 1, wherein said trough is inclined at a angle of about 45° to said surface line of said combustion chamber depression.

6. A piston according to claim 1, wherein said trough extends over about one half of the depth of said combustion chamber depression.

7. A piston according to claim 1, wherein injected fuel is directed at an angle of between about 45° to 90° onto the pertaining wall of said trough.

8. A piston according to claim 1, wherein the longitudinal central axis of said fuel injection nozzle and the longitudinal central axis of said ignition device converge towards said bottom of said combustion chamber depression.

9. A piston according to claim 1, wherein at commencement of fuel injection the pertaining ignition device and the pertaining fuel injection nozzle penetrate effectively into said combustion chamber depression.

10. A piston according to claim 9, wherein said fuel nozzle has at least one spray hole adapted to penetrate effectively into said combustion chamber depression at commencement of fuel injection.

* * * * *